(12) United States Patent
Edwards et al.

(10) Patent No.: US 6,414,251 B1
(45) Date of Patent: Jul. 2, 2002

(54) WEIGHING APPARATUS AND METHOD HAVING AUTOMATIC TOLERANCE ANALYSIS AND CALIBRATION

(75) Inventors: Jody G. Edwards; Brent A. Mattison, both of Lubbock, TX (US)

(73) Assignee: Breck Colquett, Lubbock, TX (US)

( * ) Notice: Subject to any disclaimer, the term of this patent is extended or adjusted under 35 U.S.C. 154(b) by 0 days.

(21) Appl. No.: 09/550,831

(22) Filed: Apr. 18, 2000

Related U.S. Application Data

(60) Provisional application No. 60/129,995, filed on Apr. 19, 1999.

(51) Int. Cl.$^7$ .......................... G01G 19/00; G01G 23/01
(52) U.S. Cl. ......................................... 177/145; 73/1.13
(58) Field of Search ........................... 177/50, 119, 145, 177/146, 147; 73/1.13

(56) References Cited

U.S. PATENT DOCUMENTS

| | | | | |
|---|---|---|---|---|
| 3,738,439 A | | 6/1973 | Herbert ........................ | 73/1.13 |
| 3,850,023 A | * | 11/1974 | McDonald ................... | 73/1.13 |
| 3,976,150 A | * | 8/1976 | Wilson et al. ............... | 73/1.13 |
| 4,649,494 A | | 3/1987 | Rosas .......................... | 73/1.13 |
| 4,766,965 A | | 8/1988 | Luchinger ................... | 73/1.13 |
| 4,932,486 A | | 6/1990 | Komoto et al. .............. | 73/1.13 |
| 5,666,295 A | | 9/1997 | Bruns .......................... | 73/1.13 |
| 5,861,582 A | * | 1/1999 | Flanagan et al. ............ | 177/50 |
| 5,900,591 A | * | 5/1999 | Lubakka ...................... | 177/50 |

* cited by examiner

*Primary Examiner*—Randy W. Gibson
(74) *Attorney, Agent, or Firm*—Kenneth C. Brooks

(57) ABSTRACT

A weighing apparatus and a method that features a lifting assembly connected between a calibrated load, having a weight associated therewith, and a frame, to vary an amount of the weight placed on the frame. A load-bearing member is coupled to the frame, and a load sensing system connected to the frame. The load sensing system is connected to sense the variance in the weight of the frame or the load supported by the load-bearing member. The lifting assembly operates to move the calibrated load between first and second positions. In the first position, the calibrated load is positioned spaced-apart from the frame and rests upon a surface to prevent the frame from being subjected to the mass of the calibrated load. Optimally, when placed in the first position, the load sensing system detects no load on the load-bearing member and the frame. In the second position, the calibrated load is positioned proximate to the frame. In this position, the load sensing system would sense a load equal to the amount of change in the mass, or weight, of the frame. The change in mass or weight of the frame is equivalent to the load placed thereon by the positioning of the calibrated load in the second position.

20 Claims, 6 Drawing Sheets ial patent
WEIGHING APPARATUS AND METHOD HAVING AUTOMATIC TOLERANCE ANALYSIS AND CALIBRATION

CROSS-REFERENCES TO RELATED APPLICATIONS

This application claims priority from provisional patent application No. 60/129,995, filed Apr. 19, 1999, entitled SELF CHECKING SCALE, having Jody Edwards and Alan Mattison listed as co-inventors. U.S. provisional patent application No. 60/129,995 is incorporated by reference in its entirety.

BACKGROUND OF THE INVENTION

The present invention relates to electronic weighing devices. More particularly, the present invention relates to an electronic weighing device having a system to determine the accuracy of the weight measurements made by the weighing device.

Historically, calibration of a weighing device, commonly referred to as scale, consisted of placing a known load onto a load-bearing member of the scale. The weight sensed by the scale was then checked to determine whether the same accurately reflected the load on the load-bearing member, typically referred to as a calibrating sequence. Were a discrepancy found, the scale was adjusted so that the weight sensed conformed to load presented. Otherwise, normal operation of the scale would proceed without the need for an adjustment.

To minimize weighing errors, it has been preferred to periodically enter a calibration sequence during the normal operation of a scale. However, the calibration sequence can be time consuming thereby reducing the throughput of the scale. This may prove problematic in high volume weighing applications when weighing bulk products such as bales of cotton, wheat and the like. In these high throughput operations a historic trade-off has existed between the accuracy of weight measurements and the amount of weight measurements that may be made in a unit of time.

To facilitate calibration, many scales have a built-in calibration weight. U.S. Pat. No. 4,932,486 to Komoto et al. discloses such as scale. The scale in the '486 patent includes a housing, a weighing means enclosed within the housing, a pan on which an object to be weighed is placed and a space under a top plate thereof. A sensing member has one end connected to the weighing means and projects out of a top wall of the housing. The remaining end of the sensing member is connected to and supports the pan outside of the housing. A calibration weight is arranged in the spaced under the pan. An operating means loads and unloads the calibration weight to and from the sensing member.

U.S. Pat. No. 4,766,965 to Luchinger discloses an apparatus for depositing reference weights in an electronic scale consisting of two lever connected to reciprocate about vertical axes. One end of each of the levers is always in contact with a cam disc attached on a vertically disposed shaft. The remaining end of each lever defines a gliding shoe that may be pushed below a lifting tray. By rotating the cam shaft, the lifting trays cause the reference weights to be deposited by the cam.

U.S. Pat. No. 3,738,439 to Herbert discloses a platform scale having a testing mechanism that includes a calibrated weight for determining the accuracy of the scale. The testing mechanism comprises a plurality of hangers fixed to the underside of the scale platform. The calibrated weight is suspended from the hangers. A lifting mechanism is provided that includes a plurality of bell crank levers driven by jack screws in response to actuation of a reversible electric motor. In this manner, the calibrated weight may be selectively placed in supported engagement with the hangers to calibrate the scale.

A drawback with the prior art is that the built-in calibrated weights typically require a complicated lifting mechanism to selectively place the calibrated weight on a load sensing system of the scale.

What is needed, therefore, is a scale having a built-in calibrated weight that may be selectively placed on a load sensing system of the same while minimizing the complexity of the system employed to move the calibrated load.

SUMMARY OF THE INVENTION

Provided is a weighing apparatus and method that features a lifting assembly connected between a calibrated load, having a weight associated therewith, and a frame, to vary an amount of the weight placed on the frame. A load-bearing member is coupled to the frame, and a load sensing system connected to the frame. The load sensing system is connected to sense the variance in the weight of the frame or the load supported by the load-bearing member. One embodiment of the lifting assembly includes a pneumatic system having a piston connected between the frame and the calibrated load. The pneumatic system operates to move the calibrated load between first and second positions. In the first position, the calibrated load is positioned spaced-apart from the frame and rests upon a surface to prevent the frame from being subjected to the mass of the calibrated load. In this position, the mass of the frame is minimized so that the load sensing system does not sense any load on the weighing device. Optimally, when placed in the first position, the load sensing system detects no load on the load-bearing member and the frame. Were a display connected to the load sensing system, the display would reflect a quantitative measurement of zero in the desired units, e.g., pound, kilograms and the like.

In the second position, the calibrated load is positioned proximate to the frame. In this position, the load sensing system would sense a load equal to the amount of a change in the mass, or weight, of the frame. The change in mass or weight of the frame is equivalent to the load placed thereon by positioning the calibrated load in the second position. Although the calibrated load may be of virtually any mass desired, in an exemplary embodiment, the mass of the calibrated load provides a weight of 500 pounds.

The frame may have any cross-section shape desired. In the exemplary embodiment, the frame has a rectangular shape defining four joints. The load sensing system includes a plurality of load sensors, and each of the four joints has one of the plurality of load sensors connected proximate thereto to define four supports for the frame. To increase the accuracy of a measurement of a load placed on the load-bearing member, the four supports may lie in a common plane. Placing the four supports in a common plane reduces side-loading of the frame when a load is placed on the load-bearing member. To further reduce side-loading of the mass associated with the calibrated load, the piston associated with the pneumatic system is connected along an axis of symmetry of the calibrated load. In addition, the calibrated load is connected to the frame so that the plurality of load sensors are symmetrically disposed about the calibrated load. Were a single piston employed, the piston rod would be connected to a centroid of the calibrated load. In the exemplary embodiment two piston are employed each having a rod associated therewith. Each of the rods is connected to the calibrated load at regions spaced-apart, but lying on the axis of symmetry.

The method of operating a weighing device includes subjecting the load-bearing member to a load; sensing the load with the load sensing system, defining a sensed load; verifying operational characteristics of the load sensing system; and calibrating the load sensing system by selectively varying the mass, defining a variance, and sensing the variance with the load sensing system. Usually, the load-bearing member is sequentially subjected to multiple loads. The verification of the operational characteristics of the load sensing system, such as the accuracy of weight measurements, occurs periodically. For example the verification of the operational characteristics of the load sensing system may occur after the load-bearing member has been subjected to a predetermined number of the multiple loads or after a predetermined amount of time has lapsed, or both.

These and other embodiments of the present invention, as well as its advantages and features are described in more detail in conjunction with the text below and attached figures.

DESCRIPTION OF THE SPECIFIC EMBODIMENTS

Figure 1:
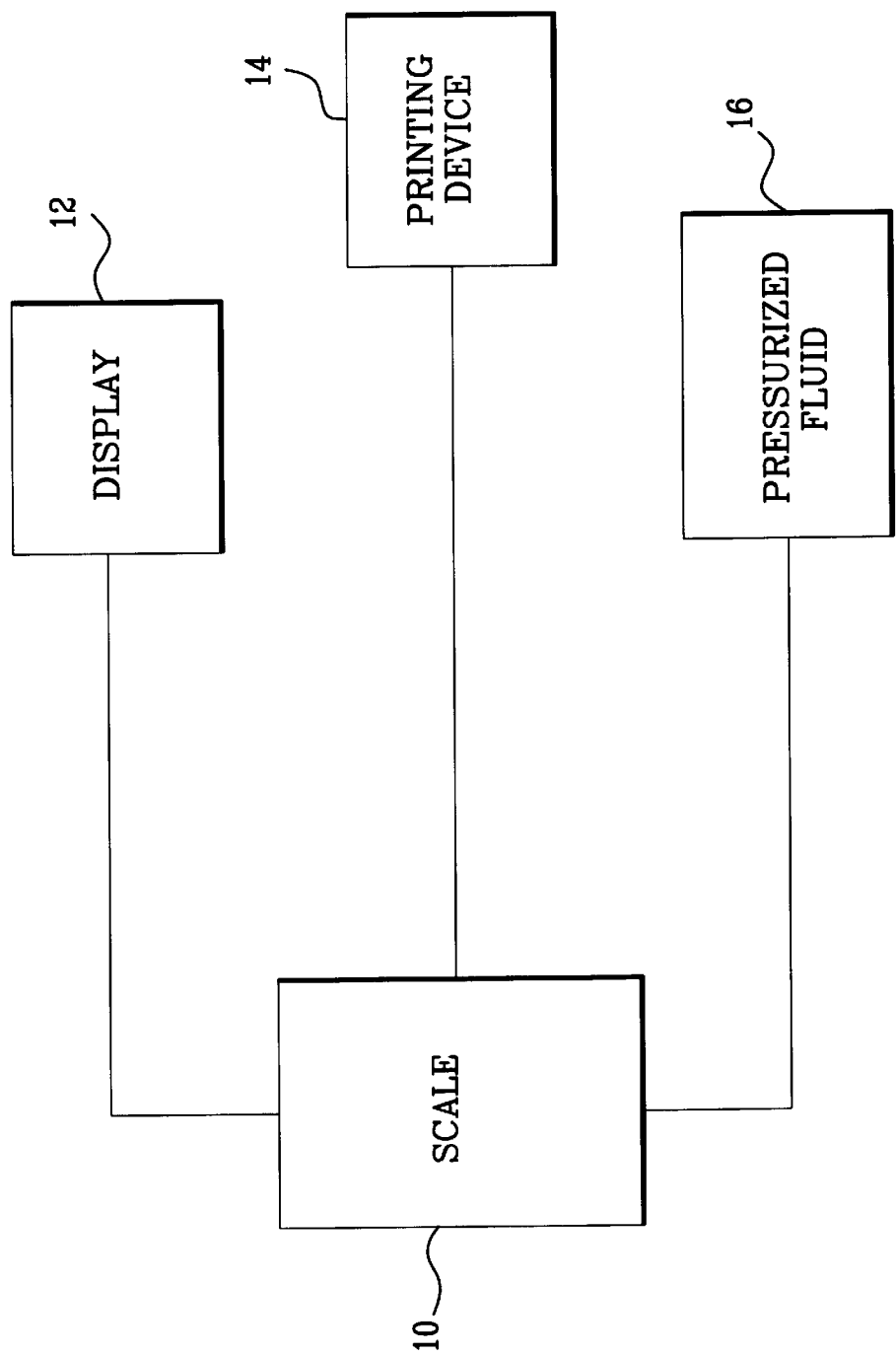
FIG. 1 is a simplified plan view of a weighing system employing the present invention.

Referring to FIG. 1, a weighing system in accordance with the present invention includes a weighing device, such as an electronic scale 10, in data communication with a display 12 and a printing device 14. A source of pressurized fluid 16 is in fluid communication with the electronic scale 10.

Figure 2:
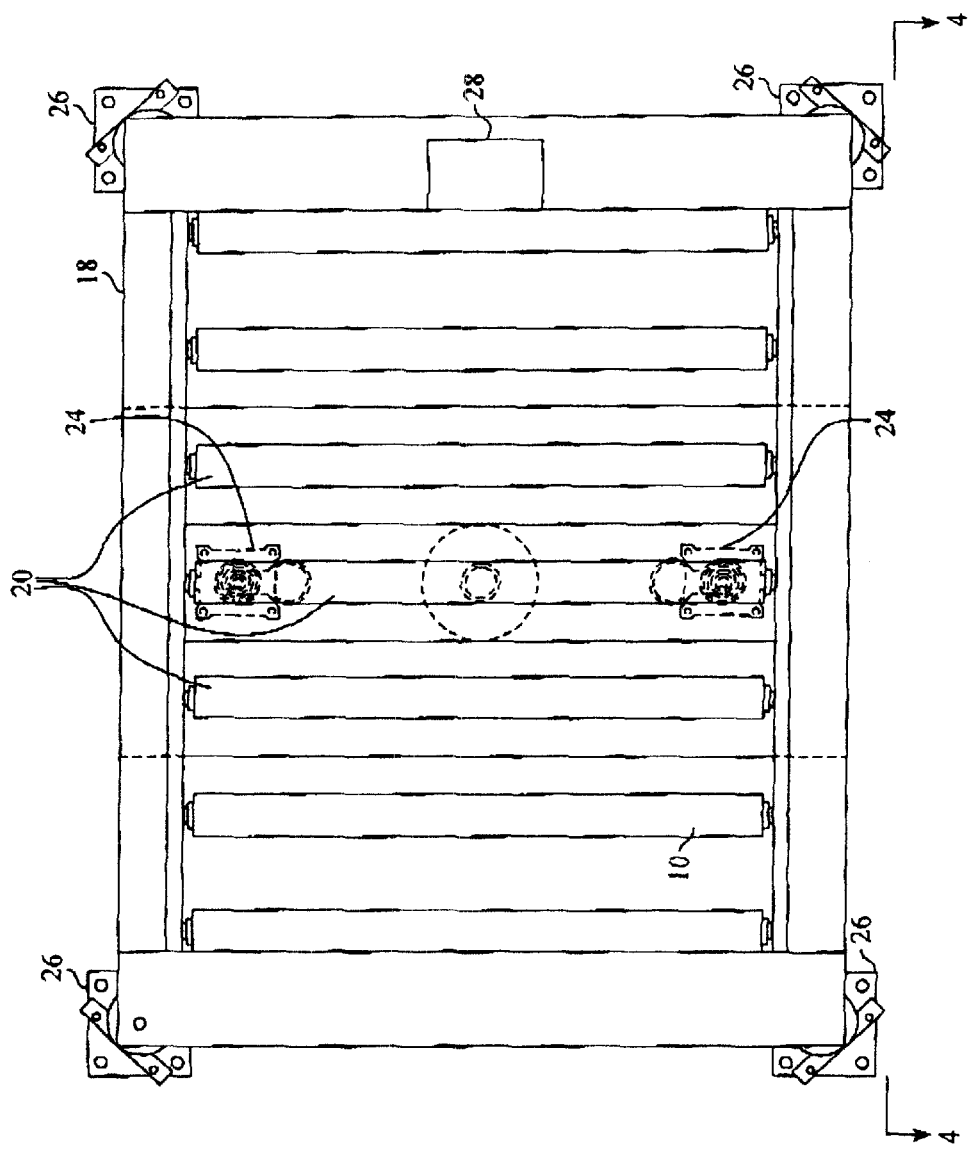
FIG. 2 is a top down view of the weighing device shown above in FIG. 1.
Figure 3:
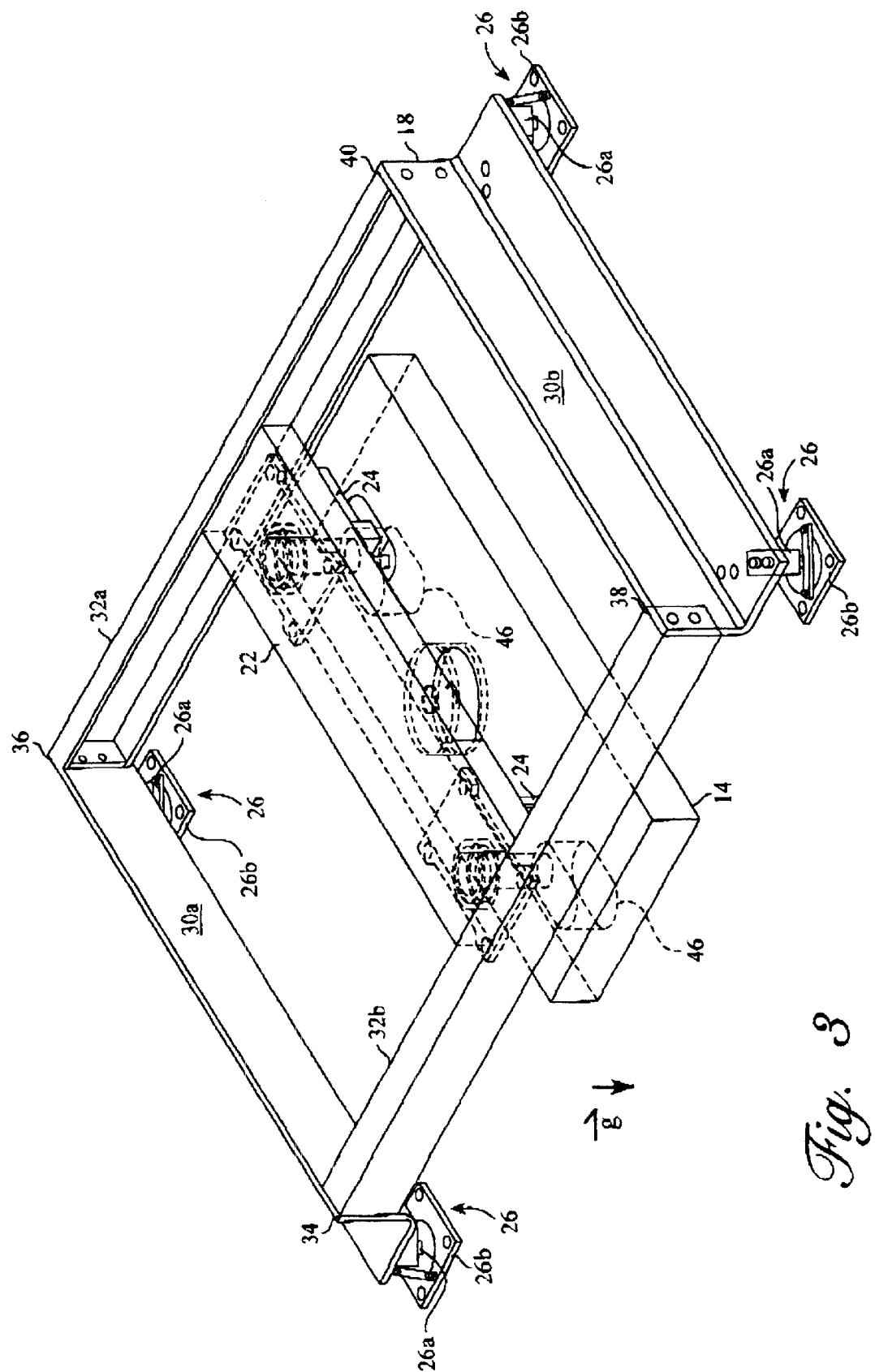
FIG. 3 is a detailed perspective view of a weighing device shown above in FIG. 1.

Referring to FIGS. 2 and 3, the electronic scale 10 includes a frame 18, one or more load-bearing members 20, a cross-member 22 having one or more pistons 24 attached thereto, with a calibrated load 25 connected to the pistons. Also connected to the electronic scale 10 is a load sensing system. The load sensing system includes one or more load sensors 26 and a general processing device 28 in data communication with the load sensors 26.

Although the frame 18 may have any shape desired, such as a triangle, a square and the like, the exemplary embodiment of the frame 18 is rectangular. To that end, the frame is formed from two pairs of spaced-apart beams 30a, 30b and 32a, 32b. The beam 30a extends parallel to the beam 30b, and the beam 32a extends parallel to the beam 32b. The opposed ends of the beam 30a are connected between one end of the beam 32a and one end of the beam 32b, defining a pair of spaced-apart joints 34 and 36. The opposed ends of beam 30b are connected between the end of the beam 32a and the end 32b, disposed opposite to the beam 30a to define a pair of spaced-apart joints 38 and 40. Opposed ends of the cross-member 22 are connected to the beams 32a and 32b, with the cross-member 22 being spaced-apart from beams 30a and 30b. Although the frame 18 may be formed from any suitable material, depending upon the application, in the present example the frame 18 is formed from steel. The beams 30a, 30b, 32a and 32b are fastened together using any known means in the art.

Each of the load sensors 26 includes a transducer 26a and a base plate 26b and is available from Rice Lake Weighing Systems located at 230 West Coleman Street, Rice Lake, Wis. 54868 under model number RL30000. The load sensors 26 are connected to the frame 18 so that the transducer 26a is positioned between the frame 18 and the base plate 26b, with the base plate 26b functioning as support for the scale 10. The transducers 26 senses movement of the frame 18 with respect to gravity $\vec{g}$ that corresponds to a load placed on the frame. In response to the aforementioned movement the transducer 26a produces a signal that is transmitted to the general processing device 28. The general processing device 28 operates on the signal and determines the weight of the load. During normal operation, the load to which the frame 18 is subjected is placed on the load-bearing member 20. This causes the frame 18 to move with respect to gravity $\vec{g}$ compressing the transducer 26a and causing the same to produce the aforementioned signal. Thus, each transducer produces a signal that is proportional to the change in mass of the frame 18 from which the general processing device 28 calculates a corresponding weight.

A desired feature of the electronic scale 10 is to periodically verify certain operational characteristics, such as the accuracy of the weight calculated by the general processing device 28. In this manner, the periodicity and magnitude of weight measurement errors may be reduced. Weight measurement errors have many causes, but the greatest contributor is believed to be the transducer 26a of the load sensors 26. To ensure that the signal produced by the transducer 26a accurately reflects the load placed on the frame 18, the calibrated load 25 is connected to the pistons 24 to facilitate periodically analyzing the operational characteristics of the electronic scale 10.

Figure 4:
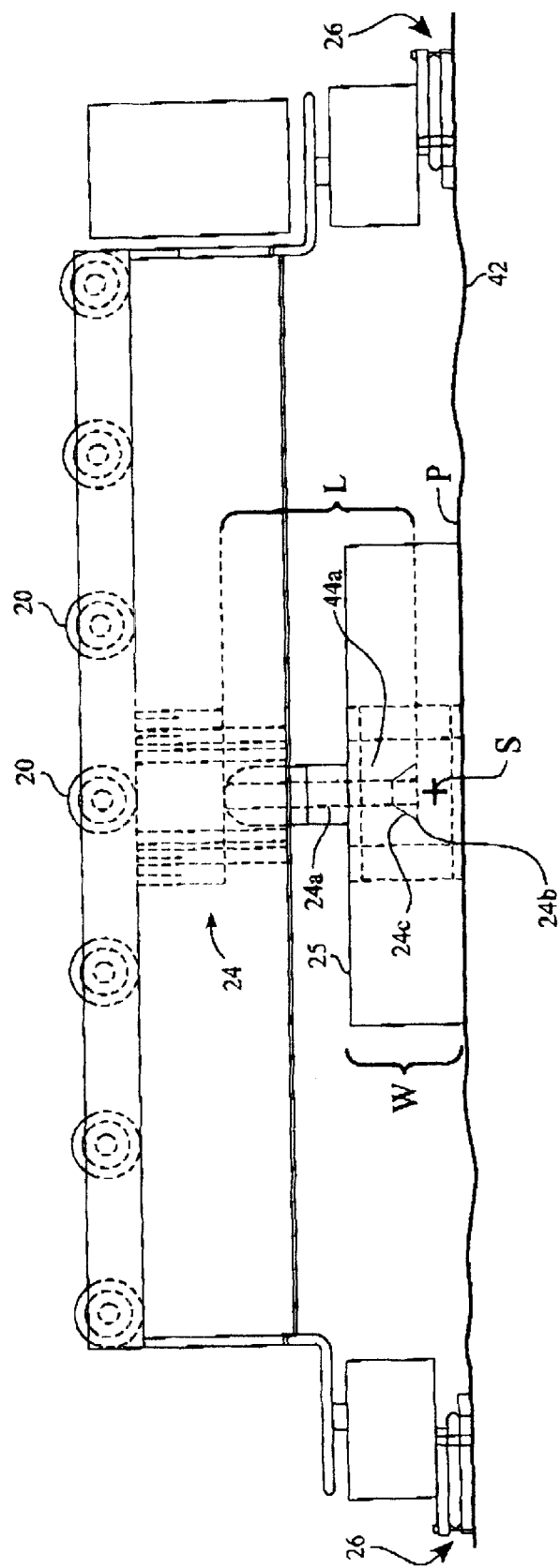
FIG. 4 is a side view of the weighing device shown above in FIG. 2 taken along lines 4—4 and showing a calibrated load in a first position.
Figure 5:
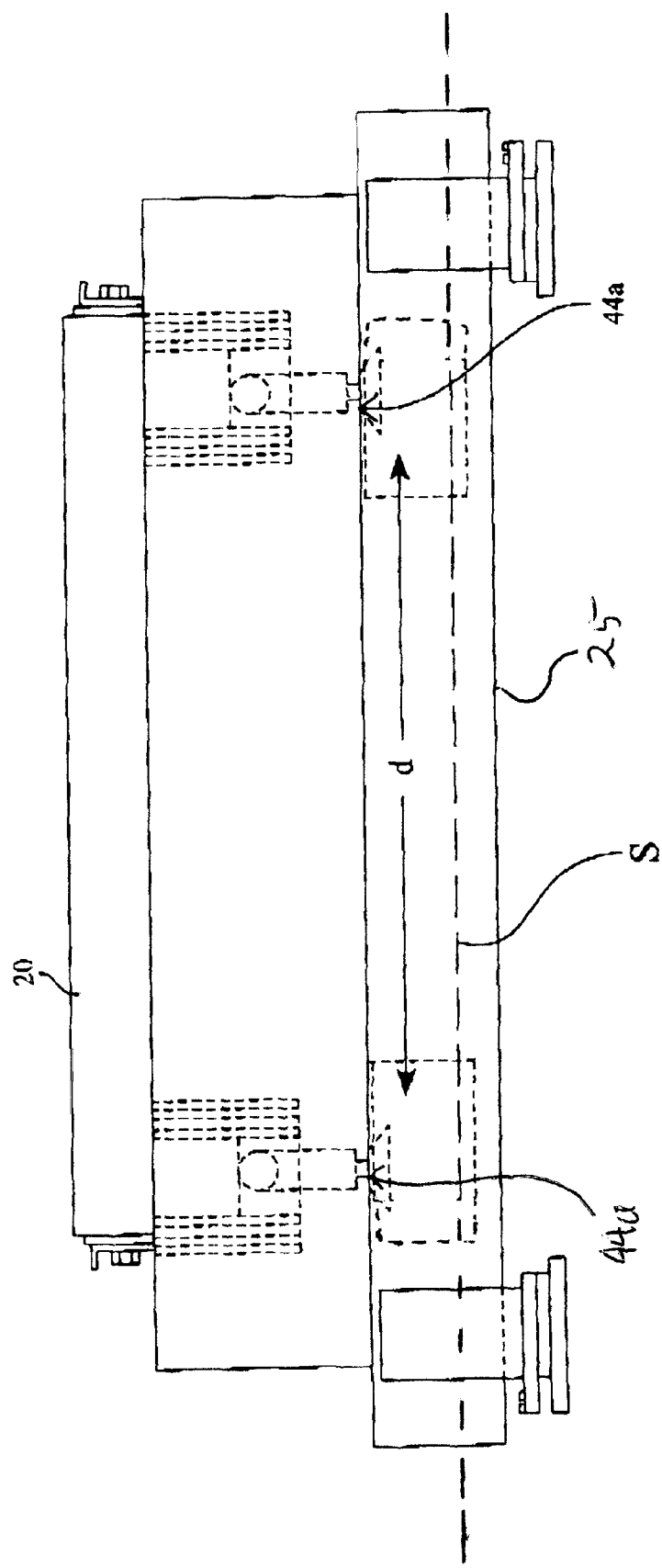
FIG. 5 is a side view of the weighing device shown above in FIG. 4 showing a calibrated load in a second position.

Referring to FIGS. 3, 4 and 5, each of the pistons 24 are connected to the calibrated load 25 via a rod 24a to move the calibrated load 25 between one of two positions. In a first position, the calibrated load 25 is spaced-apart from the frame 18, resting on a surface 42 so as prevent the frame 18 from sensing the mass associated with the calibrated load 25. In a second position, the calibrated load 25 is positioned proximate to the frame 18, spaced-apart from the surface 42. In this position, the full mass associated with the calibrated load 25 is placed on the frame 18. In this manner, movement of the pistons 24 vary the mass of the frame 18. The load sensors 26 sense the variance in the mass of the frame 18. With the calibrated load 25 being a known quantity, the accuracy of the weight measurement made by the electronic scale 10 may be quickly and easily verified. For example, were the weight calculated by the general processing device 28 to inaccurately reflect the mass of the calibrated load, then the electronic scale would be calibrated, discussed more fully below. To that end, the general processing device includes a computer program (not shown) that is within the skill of the ordinary artisan. Calibration of the scale, as discussed above, is achieved by adjusting this computer program.

A problem that may be avoided with the present invention is unwanted loading of the frame 18 by the calibrated load 25. For example, when placed in the first position, the load presented by the calibrated load 25 may be unevenly distributed on the four load sensors 26, referred to as side-loading. Side-loading is minimized by having the load sensors 26 positioned so that the base plate 26b of each lie in a common plane "P". Having the base plates 26b of the four load sensors 26 lying in the common plane "P" also reduces side-load during normal operation of the electronic scale 10, i.e., when measuring loads placed on the load-bearing member 20. In the present example, the plane "P" coincides with the surface 42, but this need not be the case.

Side-loading may also be reduced by having the load sensors 26 disposed symmetrically about the calibrated load 25. To that end, the cross-member may be positioned equidistant from the beams 30a and 30b.

Figure 6:
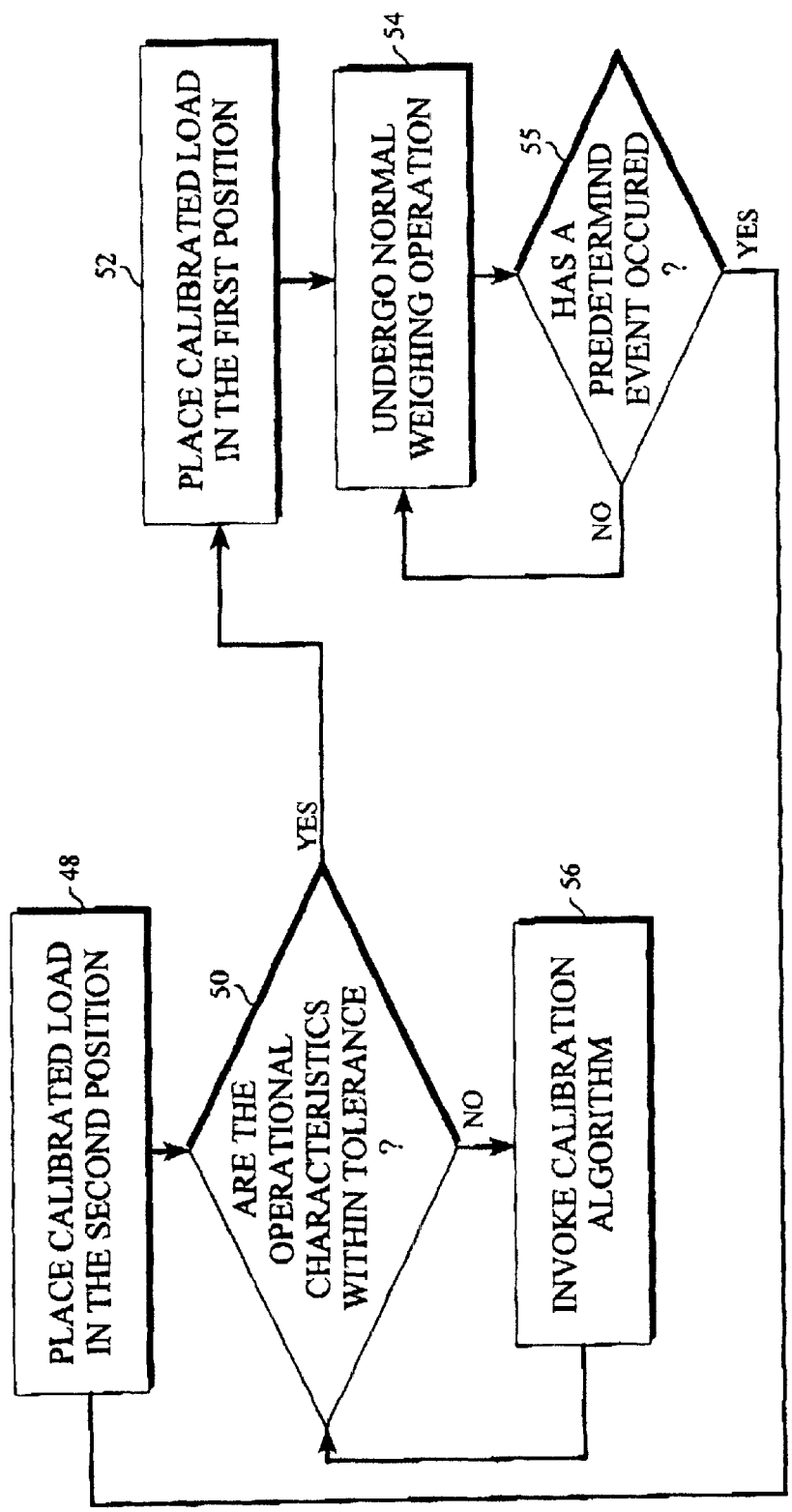
FIG. 6 is a flow diagram demonstrating the operation of the device shown above in FIGS. 1–4.

Referring to FIGS. 4 and 6, side-loading may be reduced further by having the pistons rods 24a connected to a piston centrally disposed on the calibrated load 25. Specifically, the calibrated load 25 includes two spaced-apart chambers 46 with each of the rods 24a being disposed in one of the chambers 46. Located at the end of each of the rods 24a is a boss 24b. The boss 24b forms an interference fit at a region 44a of an upper surface of the chambers 46 when the calibrated load 25 is moved from the second position to the first position. The calibrated load includes an axis of symmetry "S" along which the regions 44a lie. The regions 44a may be evenly spaced along the axis of symmetry "S". In this manner, the piston rods 24a are spaced-apart a distance "d" that is equivalent to the distance between the piston rod 24a and one of the opposed ends of the calibrated load 25 disposed proximate thereto. However, this configuration is not necessary.

It was found, however, that upon moving the calibrated load 25 between the first and second positions side-loading was still present due to rotational about the region 44a. To reduce this rotational movement, the boss 24b is formed with tapered sides 24c, and the region 44a has a profile complementary to the sides 24c. In the present example, the boss has a frusto-conical shape and the shape of the regions 44a is complementary. This structure minimizes movement about region 44a when moving the calibrated load 25 between the first and second positions.

When the calibrated load 25 is in the second position, side-loading may be reduced by establishing the relative width "W" of the calibrated load 25 and length "L" of the rod 24 so that the rod 24a remains spaced-apart from the surface 42. This prevents the rod 24a from exerting a load on the frame 18 that would result from the rod 24a pushing against the surface 42 when the calibrated load 25 is in the second position.

Referring to FIGS. 1, 4 and 7, an example of operation of the electronic scale 10 includes having the display 12 and the printing device 14 in data communication therewith by a connection to the general processing device 28. In fluid communication with electronic scale 10 is the source of pressurized fluid 16 that is connected to the pistons 24. The operational characteristics of the electronic scale 10 are typically verified before normal operations commence at step 48, by placing the calibrated load 25 to the second position. This is achieved by having the source of pressurize air 16 opening a valve (not shown) that causes the calibrated load 25 to move from the first position to the second position, thereby increasing the mass of the frame 18. The load sensors 26 sense the increase in mass and produce a signal corresponding thereto that would be sent to the general processing device 28. The general processing device 28 calculates the weight of the mass sensed by the load sensors 26 compares the calculated weight to a known weight stored in a memory (not shown) of the general processing device 28 to determine whether the operational characteristics are within tolerance at step 50. Although a calibrated load of any mass may be employed, the calibrated load 25 of the exemplary embodiment has a mass proportional to 500 pounds. Assuming that the operational characteristics were within tolerance, the electronic scale 10 would be placed in a configuration for normal operation at step 52 by closing the valve (not shown) of the source of pressurized air 16. This would allow the pistons 24 to relax placing the calibrated load 25 in the first position.

At step 54, normal weighing operation of the electronic scale 10 would commence. During normal weighing operation, the load-bearing member 20 is subjected to a load, sequentially. Although the load may be placed on the load-bearing member 20 in any known technique, the present example includes a plurality of load-bearing members 20 rotatably connected to the frame 18. In this manner, the load maybe rolled onto the load-bearing members 20. Were the operational characteristics determined to be out of tolerance at step 52, then a calibration sequence would commence at step 56 at which point the electronic scale 10 is calibrated. During the calibration sequence, the calibrated load 25 would be in the second position, and the general processing device 28 would compare the load sensed by the load sensors 26 with a known weight, as discussed above. Were a discrepancy found between the sensed load and the known weight, then the general processing device would then invoke a compensation algorithm at step 56 to ensure that the weight calculated thereby accurately reflected the mass of the load presented by the calibrated load 25. The results of the calibration may be recorded digitally in the memory (not shown) of the general processing device 48, represented on the display 12 and/or a fixed in a tangible medium by the printing device 14. Thereafter, step 50 is performed to determine whether the calibration algorithm was successful. Typically, verification of the operational characteristics of the electronic scale 10 occurs periodically. To that end, verification of the operational characteristics may occur after one of many predetermined events. Examples of the aforementioned predetermined events include subjection of the load-bearing member 20 to a predetermined number of the multiple loads, passage of a predetermined amount of time, or both. This is achieved by having the general processing device 28 determine, at step 68, whether the aforementioned predetermined event has occurred. Were the predetermined event determined to have occurred, then step 48 is performed, otherwise step 54 is performed. In this fashion, the scale 10 may be automatically checked to determine the accuracy of weight measurements, under control of the general processing device. When the accuracy of the weight measurements are found to be out of tolerance, then the general processing device 28 could automatically calibrate the scale 10.

As would be understood by those having ordinary skill in the art, the foregoing discussion has described an exemplary embodiment of the weighing apparatus and method of weighing. Several modifications may be made thereto that is within the scope of the present invention. For example, the load-bearing member need not be rotatably connected to the frame, but may consist of a pan fixedly attached thereto.

Moreover, the pneumatic lifting system that includes the two pistons may consist of a single piston connected to the centroid of the calibrated load. Alternatively, the pneumatic system may be replaced with an electromagnetic lifting mechanism to move the calibrated load between the first and second positions. Therefore, the specification and drawings are merely illustrative, and the scope of the invention should be interpreted in view thereof, but instead in light of the pending claims, including the claims full scope of equivalents.

What is claimed is:

1. A weighing apparatus, disposed adjacent to a surface, said apparatus comprising:

a frame;

a load-bearing member coupled to said frame;

a calibrated load positioned between said load-bearing member and said surface, said calibrated load having a weight associated therewith;

a load sensing system connected to said frame and including a load cell; and a lifting assembly connected to move said calibrated load between first and second positions, with said calibrated load resting against said surface in said first position proximate to said load cell and spaced-apart from said surface in said second position to vary an amount of said weight placed on said frame, defining a variance, with said load sensing system connected to sense said variance.

2. The apparatus as recited in claim 1 wherein said lifting assembly includes a pneumatic system having a piston connected between said frame and said calibrated load to move said calibrated load between said first and second positions.

3. The apparatus as recited in claim 1 wherein said calibrated load has an axis of symmetry and said lifting assembly includes a pneumatic system having a piston connected between said frame and said calibrated load to move said calibrated load between said first and second positions, said piston having a rod coupled to said calibrated load along said axis of symmetry.

4. The apparatus as recited in claim 1 wherein said load sensing system includes a plurality of load cells, with said plurality of load cells being symmetrically disposed about said calibrated load.

5. The apparatus as recited in claim 1 wherein said frame has a rectangular shape defining four joints and said load sensing system includes a plurality of loads sensors, with each of said four joints having one of said plurality of load sensors connected proximate thereto.

6. The apparatus as recited in claim 1 wherein said frame has a rectangular shape defining four joints and said load sensing system includes a plurality of load sensors, with each of said four joints having one of said plurality of load sensors connected proximate thereto, said plurality of load sensors lying in a common plane.

7. The apparatus as recited in claim 1 further including an additional load-bearing member, with both said additional load-bearing member and said load-bearing member defining a plurality of load-bearing members, with each of said plurality of load-bearing members being rotatably connected to said frame.

8. A weighing apparatus, comprising:

a frame;

a load-bearing member coupled to said frame;

a calibrated load having a weight associated therewith and a pair of spaced-apart chambers, each of which includes a region;

load sensing system connected to said frame; and a lifting assembly connected to selectively subject said load sensing system to said calibrated load by moving said calibrated load between first and second positions, with said load system including a pair of spaced-apart bosses, each of which is disposed in one of said chambers and includes tapered sides, with said region including a profile complementary to said tapered sides.

9. The apparatus as recited in claim 8 wherein said load sensing system includes a load sensor, with said first position being positioned proximate to said load sensor and said second position being located between said load bearing member and said first position.

10. The apparatus as recited in claim 9 wherein said calibrated load has an axis of symmetry and said piston includes a rod coupled to said calibrated load along said axis of symmetry.

11. The apparatus as recited in claim 10 wherein said load sensing system include a plurality of load sensors, with said plurality of load sensors being symmetrically disposed about said second position.

12. The apparatus as recited in claim 11 wherein said frame has a rectangular shape defining four joints, with each of said four joints having one of said plurality of load sensors connected proximate thereto, with said plurality of load sensors lying in a common plane.

13. The apparatus as recited in claim 12 further including an additional load-bearing member, with both said additional load-bearing member and said load-bearing member defining a plurality of load-bearing members, with each of said plurality of load-bearing members being rotatably connected to said frame.

14. A method of operating a weighing device including a frame, a load-bearing member coupled to said frame and a load sensing system coupled to sense a load on said frame, said method comprising:

subjecting said load-bearing member to a load to move said frame along a first direction;

sensing movement along said first direction to sense said load with said load sensing system, defining a sensed load;

verifying operational characteristics of said load sensing system; and selectively calibrating said load sensing system by moving said calibrated load in a second direction, opposite to said first direction, to subject said load sensing system to said calibrated load.

15. The method as recited in claim 14 wherein said load-bearing member is sequentially subjected to multiple loads, with verifying operational characteristics of said load sensing system occurring after said load-bearing member has been subjected to a predetermined number of said multiple loads.

16. The method as recited in claim 14 wherein verifying operational characteristics of said load sensing system occurs periodically.

17. The method as recited in claim 16 wherein verifying operational characteristics of said load sensing system occurs after a predetermined amount of time has lapsed.

18. The method as recited in claim 14 wherein said variance is a weight having a magnitude that is multiples of five hundred pounds.

19. The method as recited in claim 14 further including a means, connected to said load sensing system, for producing a visual representation of said sensed load.

20. The method as recited in claim 19 wherein said means for producing a visual representation of said load is selected from the set consisting of a graphical display system, a printing system and a light emitting diode system.

* * * * *